May 20, 1952 C. W. KELSEY 2,597,107
ROTARY SOIL-WORKING DEVICE
Filed March 1, 1946 3 Sheets-Sheet 1
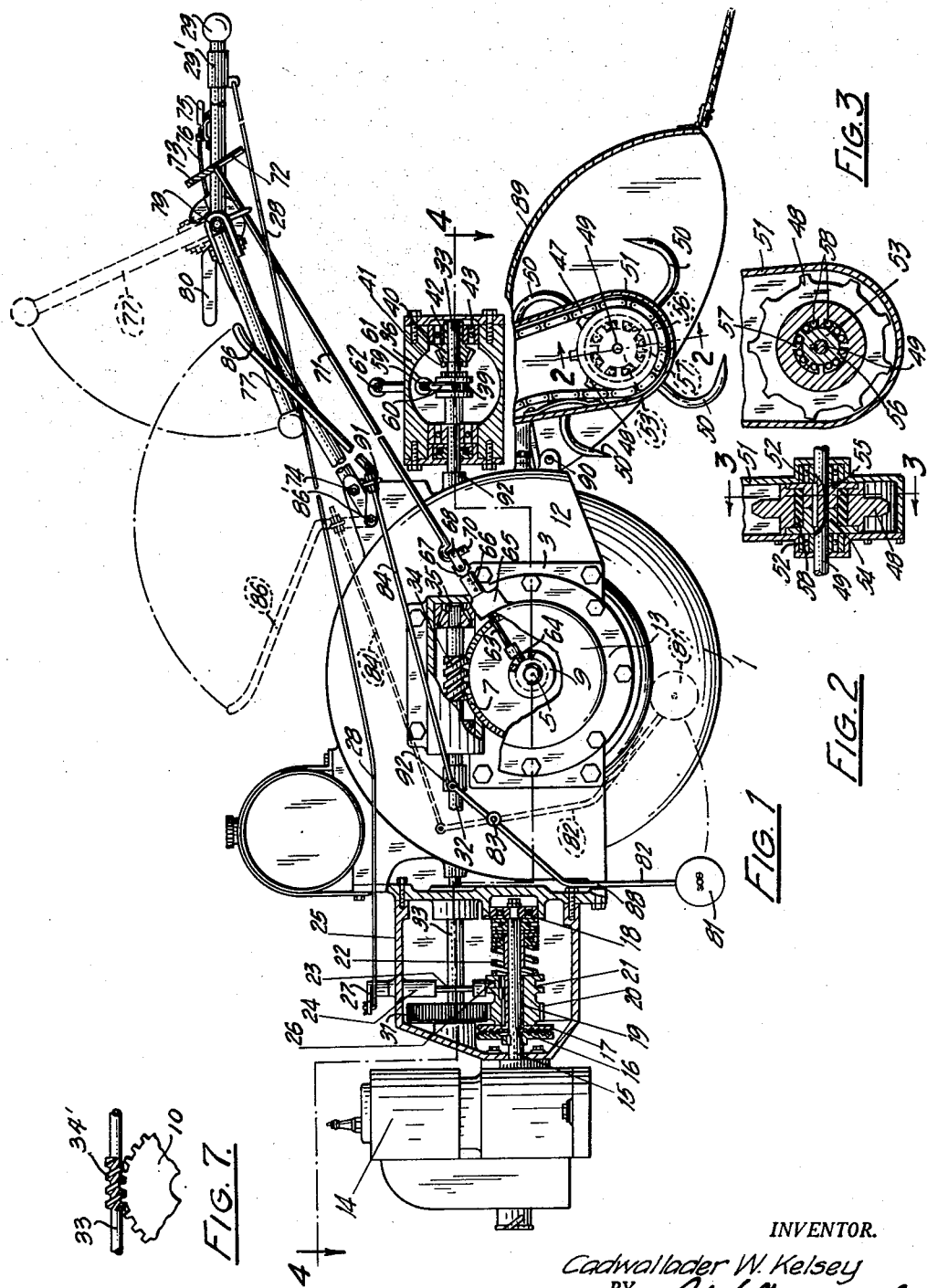
INVENTOR.
Cadwallader W. Kelsey
BY
ATTORNEY INVENTOR.
Cadwallader W. Kelsey
BY
ATTORNEY May 20, 1952   C. W. KELSEY   2,597,107
ROTARY SOIL-WORKING DEVICE
Filed March 1, 1946   3 Sheets-Sheet 3
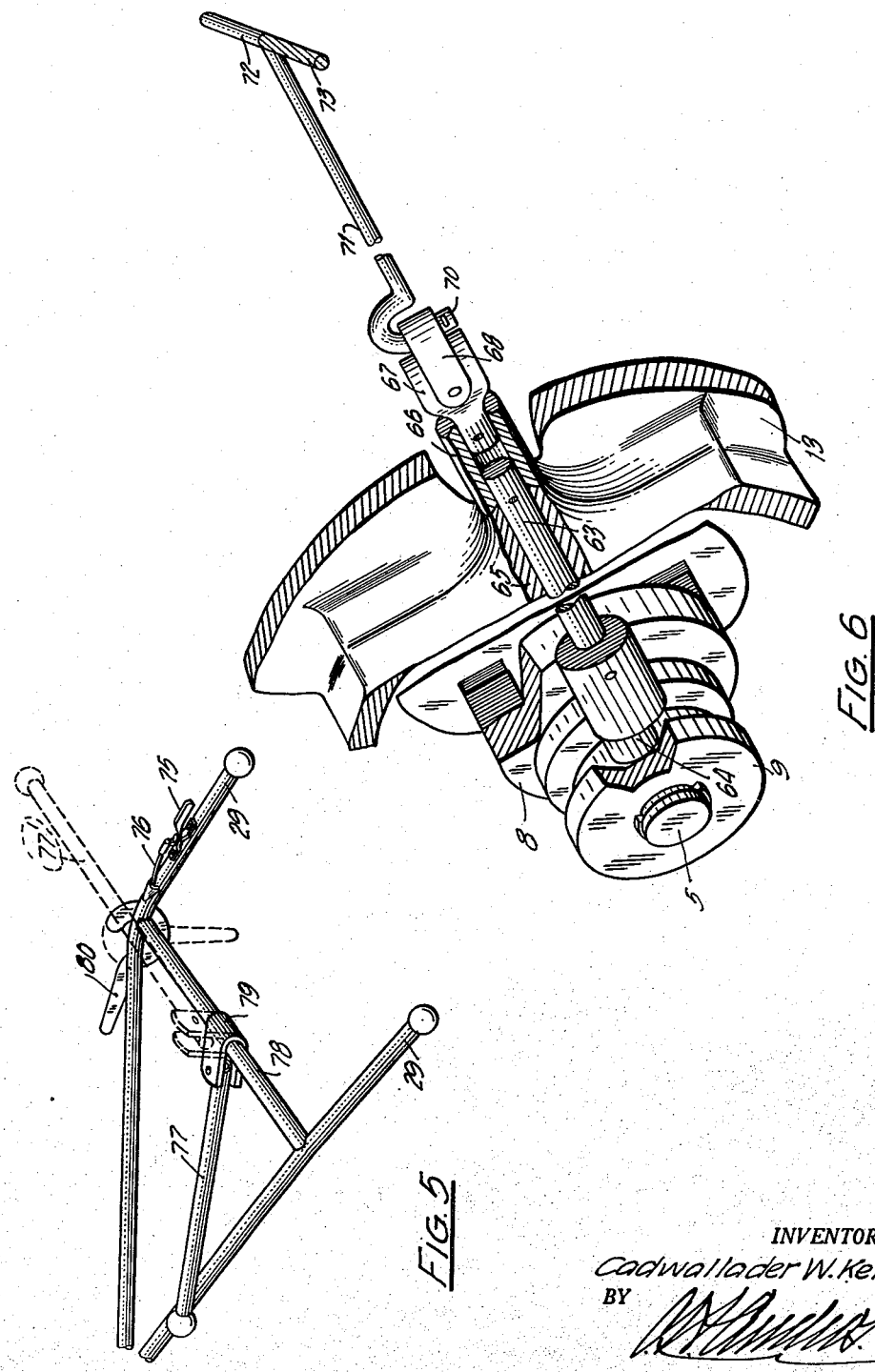
INVENTOR.
Cadwallader W. Kelsey
BY
ATTORNEY Patented May 20, 1952

2,597,107

UNITED STATES PATENT OFFICE 2,597,107

ROTARY SOIL-WORKING DEVICE

Cadwallader W. Kelsey, Troy, N. Y.

Application March 1, 1946, Serial No. 651,339

13 Claims. (Cl. 97—40)

My invention relates to rotary soil working devices and particularly to improvements in those of the so-called wheelbarrow type which are not only adapted for work in extremely confined spaces, such as between closely spaced rows of plants, but which are also adapted to meet the needs of small growers in preparing seed beds and the like, and the needs of large acreage growers for a power driven cultivator that is efficient, easy to handle, and to which various auxiliary devices, such as lawn mowers and field mowers, may be attached.

One of the objects of my invention is to provide an improved and simplified means or mechanism for transmitting power from the motor to the soil working tools and also to the wheel which propels the device over the ground. Another object is to provide, in connection with the foregoing, an improved and simplified mechanism for changing the speed of the ground wheel. Another object is to provide a new stabilizing device with means for quickly putting it into or out of operation which will not only function as a stand for maintaining the device upright, when it is not in operation, but which is also adapted so to maintain it when in operation, and particularly when used with an auxiliary attachment such, for example, as a mower.

I accomplish these and other objects by means of the novel elements and the combinations and arrangements thereof described below and illustrated in the accompanying drawings in which—

Fig. 1 is a side elevation view of my device with certain portions removed, certain portions in section, and certain portions broken away to show details of construction;

Fig. 2 is a section of Fig. 1 in the plane 2—2;

Fig. 3 is a section of Fig. 2 in the plane 3—3;

Fig. 5 is a perspective view of the handles of the device showing an auxiliary handle adapted to permit the operator to walk at the side of the machine instead of behind it;

Fig. 6 is a fragmentary perspective view of the means for operating the clutches for changing the gear ratio between the motor and the driving wheel; and Fig. 7 is a fragmentary side elevation view of the driving mechanism for the ground wheel which is located on the far side of the machine as viewed in Fig. 1.

Figure 4:
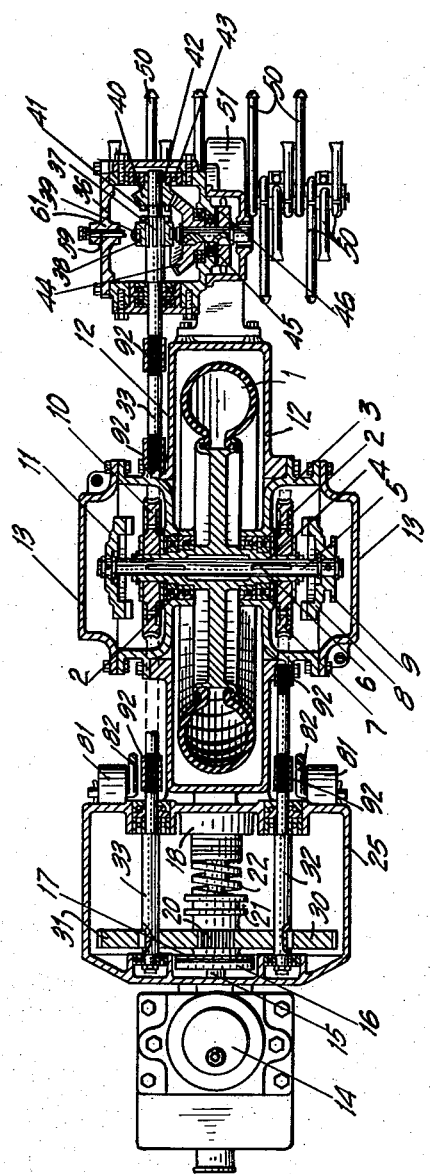
Fig. 4 is a section of Fig. 1 in the broken plane 4—4 with certain portions removed.

Referring to the drawings and first to Figs. 1 and 4, my rotary soil working device is of the wheelbarrow type having a single, centrally disposed, rubber tired ground or driving wheel 1 which is rotatably mounted in bearings 2 in the casings or housings 3. Extending through the elongated hub 4, which projects substantially at either side of the wheel 1, is a shaft 5 provided with splines 6 which prevent the shaft from turning in the hub but permit it to move axially thereof. Mounted to rotate freely on the hub 4 is a first worm wheel 7 which forms one element of a clutch; the other member 8 of the clutch being pinned or keyed to the shaft 5 so that it rotates therewith. The clutch member 8 is provided with a clutch collar 9 adapted to cooperate with means, which will be described below, for moving the male member of the clutch into or out of engagement with the worm wheel 7.

Mounted to rotate freely on the hub at the other side of the wheel 1 is a second worm wheel 10 which also forms one member of a second clutch; the other member 11 of which is pinned or keyed to the shaft 5 so that it moves therewith.

Thus, if the shaft 5 is moved axially so as to bring the clutch member 8 into engagement with its cooperating element formed in the worm wheel 7, the wheel 1 will turn with the worm wheel 7. It will also be noted that when the clutch elements 7 and 8 are in engagement, the clutch elements 10 and 11 will be out of engagement and, when the shaft 5 is moved to bring the clutch elements 10 and 11 into engagement, the clutch elements 7 and 8 will move out of engagement and the wheel will then turn with the worm wheel 10. Thus, the ground wheel may be driven by either worm wheel, depending on the position of the clutches.

The casings 3 on the opposite sides of the wheel are secured to the hood 12 which extends over the wheel 1 as best shown in Fig. 1, and covers 13 are bolted to the casings 3.

At the extreme front of the device is an internal combustion motor 14 having a drive shaft 15 to which is keyed or otherwise connected a clutch element 16, preferably of the type having V-shaped annular grooves in the face thereof, adapted to cooperate with complementary projections on the movable clutch member 17. With such a clutch, very little movement of the movable member is required to engage or disengage the clutch, and, with properly designed grooves, the members engage very smoothly. The shaft 15 of the motor, at the rear end thereof, is mounted in a bearing 18, and the clutch element 17 is provided with a sleeve 19 which may slide axially on the shaft 15. Keyed or otherwise secured to the sleeve 19 is the main driving gear 20 which has a clutch collar 21 secured thereto or integral therewith. The clutch member 17 is normally held in engagement with the member 16 by means of the compression spring 22.

In order to engage and disengage the members 16 and 17, I provide a shaft 23, which is mounted in a bearing 24 in the housing 25, with an eccentric pin 26 at the lower end thereof which rides in the clutch collar 21. A crank arm 27 is secured to the shaft 23 at the top thereof and a clutch operating rod 28 extends from the crank arm to the handle bar 29 where it is connected to the sleeve 29' which is slidably mounted on the bar.

The gear 20 drives a pair of gears 30 and 31 at each side thereof which are keyed to and drive the shafts 32 and 33, respectively. These shafts extend rearwardly along each side of the ground wheel 1 and have worms mounted thereon, such as shown at 34 (see Fig. 1), and 34' (see Fig. 7), which mesh with the worm wheels 7 and 10, respectively, (see Fig. 4); the worm 34 on shaft 32 meshing with worm wheel 7 and the worm 34' on shaft 33 meshing with worm wheel 10. The worm 34, as illustrated in Fig. 1, is a double threaded worm, but may be triple threaded, while the worm 34', as illustrated in Fig. 7, is a single threaded worm. The particular threading on either worm is immaterial, but one of the worms and its cooperating worm wheel are designed, at a given engine speed, to turn the ground wheel 1 two or three times as fast as the other worm.

The shaft 32 terminates just beyond the worm 34 in a bearing 35 is shown in Fig. 1, but the shaft 33 extends to the rear of the machine and into the housing 36. Within the housing 36 the shaft 33 is splined as shown at 37 and a clutch element 38 including a clutch collar 39 is mounted to slide on the splined portion of the shaft 33. A bevel pinion 40 having clutch dogs 41 associated therewith and adapted to cooperate with the clutch member 38 is rotatably mounted on a reduced portion of the shaft 33 at the extreme rear end thereof, and a sleeve portion 42 of the pinion 40 is mounted in the bearing 43. Cooperating with the pinion 40 is a ring gear 44 (see Fig. 4) which is keyed to the transverse shaft 45 mounted in bearings in the casing or housing 36. Keyed or otherwise secured to the shaft 45 is a sprocket 46, and a chain 47 (see Fig. 1) extends from the sprocket 46 to the sprocket 48 which drives the shaft 49 on which the soil working tools 50 are mounted. The chain and sprocket 48 are enclosed in a housing 51 and the shaft 49 is mounted in bearings 52 (see Fig. 2) in this housing.

In order to provide a yielding, shock-absorbing connection between the sprocket 48 and the shaft 49, they are not secured rigidly together as will be apparent from a consideration of Figs. 2 and 3 in connection with the following description. Keyed to the shaft 49 is a driven element 53 which is formed in two halves 54 and 55 as shown in Fig. 2. The element 53, as shown, is provided with four, vane-like projections 56 which extend radially outwardly from the exterior surface thereof and are spaced 90° apart, as shown in Figs. 1 and 3. The interior of the hub of the sprocket 48 is also provided with four, similar, vane-like projections 57 extending radially inwardly and spaced 90° apart and in circumferentially spaced relation to the vanes 56. In the spaces between the vanes are resilient blocks 58 of rubber or the like so that the driving force from the sprocket is transmitted to the shaft 49 through these blocks.

In order to engage and disengage the clutch elements on the clutch collar 39 and those on bevel pinion 40, a shaft 59 (see Figs. 1 and 4), having a fork 60 which engages the clutch collar 39 is mounted in a bearing 61 in the side of the housing 36, and an upwardly-extending, hand lever 62 is connected to the shaft 59 on the outside of the housing 36.

To start a forward movement of the machine and to change the speed of this movement, I provide a means for moving the clutch elements 8 and 11, shown in Fig. 4 in neutral position, so that the wheel 1 is driven either from the worm wheel 7, which is the low speed, or through the worm wheel 10 which is the high speed. Thus, referring to Figs. 1 and 6, I provide a shaft 63 having an eccentric projection 64 at the lower end thereof which rides in the clutch collar 9. A bearing 65 for the shaft 63 may be cast integral with the casing cover 13. Pinned to the upper end of the shaft 63 is a collar 66, and pinned to the collar is an element 67 to which in turn is pinned the element 68 having an eye therein adapted to receive the hooked end 70 of the rod 71 which extends up to the handle 29. The upper end of the rod 71 is provided with a hand grip 72 forming a T head for the rod 71. One half of this T head may be painted red or some other suitable color, as shown at 73, and the rod may be so adjusted that, for example, when the T head is horizontal, the clutches are in neutral as shown in Fig. 4; when the red end of the T head is up, the machine is in high gear; and when the red end is down, the machine is in low gear.

In order to steer and control the machine, a pair of handle-bars 29 (see Figs. 1 and 5) is provided which may be attached to the machine at any suitable place such as shown at 74 in Fig. 1. One of the handle-bars may be provided with a throttle controlling lever 75 which is connected to the throttle valve of the motor by means of a Bowden wire 76.

At times, it is desirable to guide the machine from the side instead of from the rear and, in order to facilitate this, I provide an extra handle 77 which is pivotally connected to the cross bar 78 between the handle-bars 29 as shown at 79. By swinging the handle upwardly about the axis of the cross bar 78 and then swinging it downwardly into the position shown in dotted outline at 77'. The operator may stand at one side of the machine and grasp both the handle 77 and the adjacent handle-bar 29. A latch 80 is provided for locking the handle 77 in the position shown in the dotted lines.

In order to provide a stand for the machine so that it will remain upright when not in operation and to assist the operator in maintaining the machine upright when in operation, as with a mowing attachment or the like, I provide the wheels or rollers 81 (see Figs. 1 and 4) which are mounted at the lower end of the rods 82 at opposite sides of the machine so that the bottoms of the rollers are at about the same elevation as the bottom of the ground wheel. The rods 82 are pivotally connected to the wheel housing 12 as shown at 83. Pivotally connected to the upper ends of the rods 82 are rods 84 which, in turn, are pivotally connected to the hand lever 86 at 91, just beyond the points 86' where the hand lever is connected to the machine. By swinging the hand lever 86 to the position shown in dotted outline, the rollers 81 may be raised from the ground. When the hand lever 86 is in the position shown in solid outline in Fig. 1, the rods 82 bear against the frame of the machine, as shown at 88, and the pivotal connections 91 are below, or have passed beyond the axis of the connections 86' so that shock or force acting on the rollers 81 and tending to swing them backwardly about their pivotal connections 83 is prevented.

In order to limit the extent to which the soil worked by the tools 50 is thrown thereby, a hood 89 which is pivotally connected to the frame at 90 is provided.

It will be noted from Figs. 1 and 4 that the shafts 32 and 33 are formed in a plurality of sections which are connected together by the splined couplings 92. It will also be noted that the frame of the machine is formed from a plurality of separate casings or housings which are bolted together. Thus, it is possible readily to detach the soil working tools together with their driving mechanism, or the motor and the main clutch and driving gears as single units for inspection, repair or replacements.

While I have described and illustrated my invention in its preferred embodiment, it is to be understood that in many instances, due to the small scale of the drawings, details such as bearings and other small parts cannot be illustrated except in a more or less conventional manner and, in many instances, are omitted entirely in order more clearly to illustrate the essential features of the invention.

What I claim is:

1. In a rotary soil working device, the combination with a plurality of rotary soil working tools and mountings therefor, of a ground wheel, a motor, means for supporting said tools, mountings, and motor on said wheel, mechanism including a shaft operatively connecting said tools and said motor, means for operatively connecting said shaft to said wheel to drive said wheel, and alternate means independent of said shaft for driving said wheel.

2. In a rotary soil working device of the wheelbarrow type, the combination with a motor, of a plurality of rotary soil working tools and mountings therefor, a ground wheel positioned between said motor and said tools, two shafts driven by said motor, one at each side of said wheel, means including a clutch for operatively connecting one of said shafts to said tools, separate means for driving said wheel from either of said shafts but at different speeds, and means for operatively and selectively connecting said driving means to said wheel.

3. In a rotary soil working device of the wheelbarrow type, including a motor, a plurality of rotary soil working tools, mountings for said tools and mechanism for driving said tools from said motor, the combination with a ground wheel for propelling said device over the ground, of a plurality of shafts, means for operatively connecting said shafts to said motor to be simultaneously driven thereby, separate means for driving said ground wheel from each of said shafts, and a clutch for selectively and operatively connecting said ground wheel to either of said driving means.

4. In a rotary soil working device of the wheelbarrow type, including a motor, a plurality of rotary soil working tools, mountings for said tools and mechanism for driving said tools from said motor, the combination with a ground wheel having an elongated hub, of a pair of gears mounted to rotate freely on said hub, a pair of shafts driven by said motor each provided with a gear element cooperating with one of said pair of gears, and a clutch for selectively connecting either of said pair of gears to said ground wheel for driving said wheel from said motor.

5. In a rotary soil working device of the wheelbarrow type having a single driving wheel and a plurality of rotary soil working tools, the combination with a motor, of a pair of shafts extending longitudinally of said device for driving said wheel and said soil working tools, means for operatively connecting said shafts to said motor to be driven thereby in the same direction, and means, including manually actuated means, for operatively and selectively connecting either of said shafts to said driving wheel.

6. In a rotary soil working device of the wheelbarrow type, including a motor, a plurality of rotary soil working tools, mountings for said tools and mechanism for driving said tools from said motor, the combination with a ground wheel having an elongated hub, a worm wheel mounted to rotate freely on said hub on each side of said ground wheel, a pair of shafts driven by said motor and disposed on opposite sides of said ground wheel, a worm on each of said shafts in mesh with the adjacent worm wheel on said sub, and manually actuated means for drivingly connecting either of said worm wheels to said ground wheel.

7. A rotary soil working device comprising in combination a motor, a plurality of rotary soil working tools, a ground wheel, a plurality of gear elements and bearings therefor coaxial with said ground wheel upon which said gear elements may freely rotate, means for driving said tools from said motor, a plurality of shafts driven by said motor each having a gear element thereon cooperating with and driving one of said first mentioned gear elements, the gear ratios of said cooperating pairs of gear elements differing from each other; and a clutch for selectively coupling either of said first mentioned gear elements to said ground wheel for driving the same at different speeds with the same motor speed.

8. The structure set forth in claim 7 in which the last mentioned gear elements are worms.

9. In a driving and change speed mechanism for a rotary soil working device having a motor, and a ground wheel, the combination with a hub on said ground wheel of a splined shaft mounted in said hub and rotatable therewith but slidable axially therein, a gear on each side of said ground wheel, and a bearing for each of said gears coaxial with said wheel on which said gears may rotate independently of said wheel, means for simultaneously driving said gears from said motor but at different speeds, and means on said shaft for operatively and selectively coupling either of said gears to said wheel for driving the same.

10. A rotary soil working device comprising a ground wheel having an elongated hub, a worm gear mounted to rotate freely on said hub on each side of said ground wheel, a driving motor, a pair of shafts driven by said motor, one on each side of said ground wheel, and each having a worm thereon cooperating with one of said worm gears; the worm and its cooperating gear on one side of said ground wheel having a substantially different gear ratio than the worm and gear on the other side of said ground wheel, an axially slidable shaft coaxial with said ground wheel and means drivingly connecting it to said wheel, a clutch element on said shaft adjacent each of said worm gears adapted drivingly to connect the adjacent worm gear to said shaft, rotary soil working tools, and means drivingly connecting said tools to one of said shafts; whereby, at a given motor speed, the rate at which said device is propelled over the ground may be changed without changing the rate at which said tools are driven.

11. A rotary soil working device comprising a frame, a single, centrally-disposed ground wheel rotatably mounted in said frame a motor positioned in front of said ground wheel, a transversely extending shaft rotatably mounted behind said ground wheel and having soil working tools thereon, handles extending rearwardly of said device for operating the same, a main shaft extending longitudinally of said device alongside said ground wheel, means drivingly connecting said motor to said main shaft, means drivingly connecting said main shaft to said wheel, and means drivingly connecting said main shaft to said transversely extending shaft; said frame, handles, motor, and said transversely extending shaft with said tools thereon being substantially symmetrically disposed about a vertical plane through the center of said wheel and perpendicular to the axis thereof; whereby said device is substantially balanced with respect to said plane and the operation thereof from said handles is facilitated.

12. A rotary soil working device comprising a frame, a single, centrally-disposed ground wheel rotatably mounted in said frame a motor positioned in front of said ground wheel, a transversely extending shaft rotatably mounted behind said ground wheel and having soil working tools thereon, handles extending rearwardly of said device for operating the same, a main shaft extending longitudinally of said device alongside said ground wheel, means including a first clutch drivingly connecting said motor to said main shaft, means including a second clutch drivingly connecting said main shaft to said wheel, and means including a third clutch drivingly connecting said main shaft to said transversely extending shaft; said frame, handles, motor, and said tranversely extending shaft with said tools thereon being substantially symmetrically disposed about a vertical plane through the center of said wheel and perpendicular to the axis thereof; whereby said device is substantially balanced with respect to said plane and the operation thereof from said handles is facilitated.

13. A rotary soil working device comprising in combination a motor, a plurality of rotary soil working tools, a ground wheel, a gear element and a bearing therefor coaxial with said ground wheel on which said gear element is freely rotatable independently of said ground wheel, a shaft driven by said motor for driving said tools, a worm on said shaft cooperating directly with said gear element, and clutch mechanism for operatively connecting said gear element to said ground wheel for driving said wheel therefrom.

CADWALLADER W. KELSEY.

REFERENCES CITED

The following references are of record in the file of this patent:

UNITED STATES PATENTS

| Number | Name | Date |
|---|---|---|
| 904,326 | Henderson | Nov. 17, 1908 |
| 1,817,848 | Rogers | Aug. 4, 1931 |
| 1,936,606 | Nicholson | Nov. 28, 1933 |
| 1,952,091 | Nicholson | Mar. 27, 1934 |
| 1,975,417 | Dufour | Oct. 2, 1934 |
| 2,368,290 | Donald | Jan. 30, 1945 |

FOREIGN PATENTS

| Number | Country | Date |
|---|---|---|
| 384,811 | Germany | Nov. 6, 1923 |
| 213,241 | Great Britain | Nov. 20, 1924 |
| 420,542 | Great Britain | Dec. 4, 1934 |